United States Patent [19]

Laing et al.

[11] 4,187,982
[45] Feb. 12, 1980

[54] APPARATUS FOR INCREASING THE TRANSMISSION CAPACITY OF REMOTE HEATING GRIDS

[76] Inventors: Nikolaus Laing; Ingeborg Laing; Oliver Laing, all of Hofener Weg 35-37, D 7141 Aldingen, Fed. Rep. of Germany

[21] Appl. No.: 813,064

[22] Filed: Jul. 5, 1977

[30] Foreign Application Priority Data

Jul. 9, 1976 [AT] Austria .................................. 95061/76
Jan. 14, 1977 [AT] Austria ..................................... 206/77

[51] Int. Cl.² ............................................. G05D 23/00
[52] U.S. Cl. .................................... 237/2 B; 126/400; 237/13
[58] Field of Search ................ 237/1 A, 2 B, 8 R, 13; 126/400; 165/18

[56] References Cited

U.S. PATENT DOCUMENTS

| 247,529 | 9/1881 | Baker | 237/13 |
|---|---|---|---|
| 2,532,608 | 12/1950 | Dalin | 237/8 R X |
| 2,560,282 | 7/1951 | Geisseler | 237/8 |
| 2,796,743 | 6/1957 | McFarlan | 62/324 X |
| 3,595,476 | 7/1971 | Eaton | 237/8 |
| 3,960,136 | 6/1976 | Moan et al. | 237/1 A |
| 3,996,759 | 12/1976 | Meckler | 165/18 X |
| 4,007,776 | 2/1977 | Alkasab | 165/18 |
| 4,020,895 | 5/1977 | Schafer | 165/18 X |
| 4,021,895 | 5/1977 | Morse et al. | 126/400 |
| 4,030,312 | 6/1977 | Wollin | 62/324 X |
| 4,034,738 | 7/1977 | Barber, Jr. | 237/1 A |
| 4,044,949 | 8/1977 | Morawetz et al. | 126/400 X |
| 4,052,001 | 10/1977 | Vogt | 126/400 X |
| 4,061,267 | 12/1977 | Lof | 126/400 X |
| 4,063,546 | 12/1977 | Schmid et al. | 126/400 |
| 4,064,931 | 12/1977 | Laing | 126/400 X |
| 4,070,870 | 1/1978 | Bahel et al. | 62/324 X |
| 4,071,079 | 1/1978 | Engelbrecht | 126/400 X |
| 4,077,464 | 3/1978 | Moog | 126/400 X |

FOREIGN PATENT DOCUMENTS 920460 2/1973 Canada ...................................... 126/400
2305694 10/1976 France ........................................ 62/324

OTHER PUBLICATIONS

"Solor Energy Research", Dec. 1972, FIG. 10, Staff Report of the Committee on Science and Astronautics of the House of Rep.

*Primary Examiner*—Leslie Braun
*Attorney, Agent, or Firm*—Pennie & Edmonds

[57] ABSTRACT

For the purpose of improving the utilization of remote heating grids, particularly for space air heating, at least one heat storage device is connected in series with the heaters of a hot water heating circuit, whereby the water conduit from the remote heating grid to the heating circuit can be operated 24 hours a day at its full capacity, so that for any given diameter of the conduit approximately twice the heat quantity previously transmitted can be transmitted with a consequent increase in the rating of the remote heating grid.

6 Claims, 2 Drawing Figures

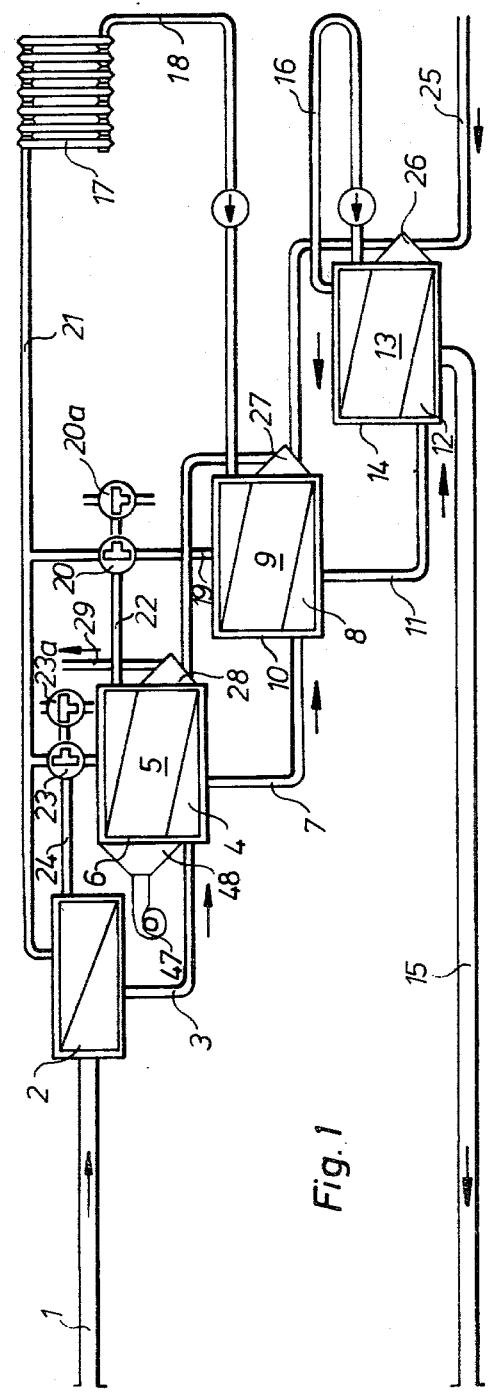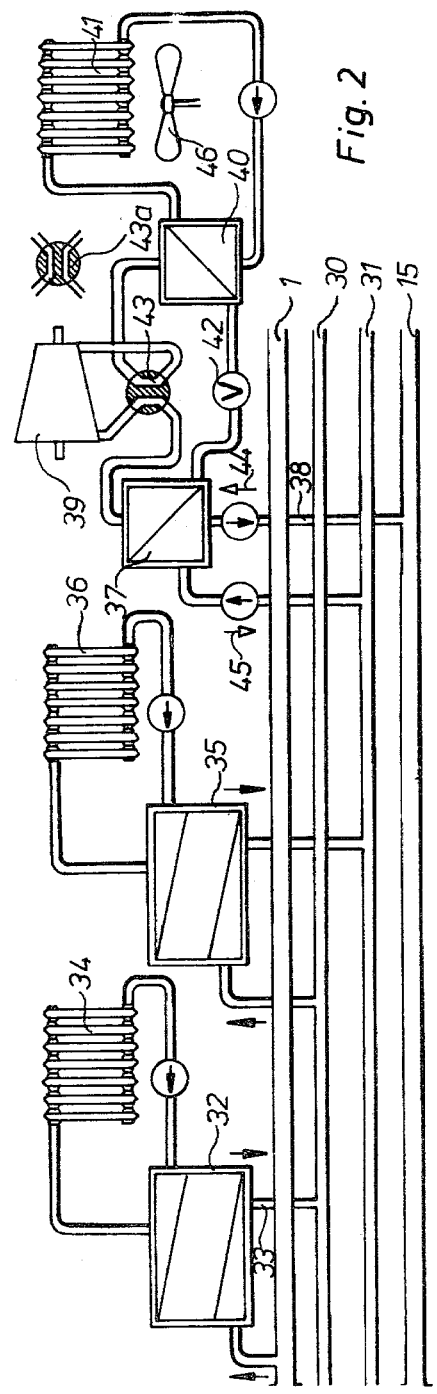

APPARATUS FOR INCREASING THE TRANSMISSION CAPACITY OF REMOTE HEATING GRIDS

The invention relates to a heating circuit comprising radiators, which is supplied with heat from a remote heating grid, particularly for space air heating. Remote heating grids have the disadvantage of high investment cost. The maximum heating capacity is determined by the diameter of the pipe conduits. This maximum heating capacity is utilized only during the morning heating-up period for the buildings, during the day the capacity required drops, and is reduced to a fraction during the night. Consequently the transmission of the heat flow is cyclic, the mean value of the capacity over a day being only approximately half of the maximum capacity.

The invention eliminates this disadvantage, in that it introduces into the heating circuits of the buildings, which are supplied by remote heat, latent heat storage devices, latent heat storage devices of different crystallization temperatures preferably being connected in series and arranged for the passage therethrough of a stream of water from a remote heating grid. Thereby they become charged simultaneously and the remote heating water leaves the building of the heat consumer at a relatively low temperature. By means of this invention the remote heating conduit comprising part of a heat supply circuit can be operated continuously over a period of 24 hours at its full capacity, so that for any given diameter of the pipe conduit of the remote heating grid, approximately twice the heat quantity previously transmitted can be transmitted, with a consequent increase in the rating of the remote heating grid.

The flow in the internal heat user circuit of the building is in the opposite direction to that of the remote heating water stream which charges it. The invention proposes the introduction of heating elements which cause the heating water to be cooled to a substantial extent. These include especially counter-current convectors as well as large area heating elements; there is moreover provided a series circuit of consumers at differential working temperatures, the arrangement, for example, being such that the flow takes place first through a radiator, then a ceiling heating installation and finally a floor heating installation. The relatively cold return water of the heating circuit of the consumer is preheated by the latent heat storage device at the lowest temperature and finally flows through the latent heat storage device having the highest crystallization temperature. Moreover it is thereafter yet heated by a heat exchanger from the remote heating input temperature to a temperature corresponding to the remote heating temperature. If the maximum heating capacity is not required in the heating circuit, flow takes place only through the latent heat storage devices of appropriately low crystallization temperature; i.e. the latent heat storage devices operating at a higher temperature are not discharged.

The heating of water for consumption also takes place via a plurality of heat exchangers disposed in the latent heat storage devices, through which, beginning with the lowest temperature, flow takes place in the opposite direction to that of the remote heating circuit.

In accordance with the invention it is possible not only to sub-divide the heat storage devices into such devices of differential temperature within a building, but also within a district being supplied. Some of the heat consumers then receive the heat at a high temperature, a subsequent group utilizing the return water from the first consumer group. A third group is, for example, supplied with the return water from the second consumer group. For this group the invention preferably proposes the provision of heat pumps, which enables a substantial reduction in the water temperature of the remote heating grid, this resulting in a high efficiency of the power station whose condenser supplies the heat.

As a further measure for increasing the energy obtainable from a remote heating grid over a year, the invention proposes the introduction of an auxiliary heating installation, preferably using gas or oil, for the purpose of additionally heating the heating circuit when the heat demand is extremely high. Preferably this additional heat is introduced partly for the purpose of charging storage devices. A further measure in accordance with the invention consists in providing the heat pumps in a form in which they can be switched over in order to impose the unwanted heat during the summer on the remote heating circuit, preferably in the reverse direction of flow.

The invention will be described with reference to drawings.

FIG. 1 shows an embodiment of the invention in which the heat carrier of the remote heating input first flows through the heat exchanger.

FIG. 2 shows a remote heating grid having the input conduit and the return conduit and two compensating conduits.

FIG. 1 shows an arrangement embodying the invention, in which the heat carrier of the remote heating input 1 first flows through the heat exchanger 2. Then it is conducted via the conduit 3 through a heat exchanger 4, with which the storage mass 5 in the storage container 6 is in good heat-conducting contact. Thereafter the heat carrier flows through the conduit 7 into the heat exchanger 8, which is in good heat-conducting contact with the storage mass 9 of the storage device 10. In the same way it then flows through the conduit 11 and the heat exchanger 12, which is in heat-conducting contact with the storage mass 13 of the storage device 14 and then enters the return conduit 15. Input 1, conduits 3, 7, 11 and return conduit 15 all form part of a heat supply circuit. The heat storage device 14 having the lowest crystallization temperature supplies the large-area heating element 16. From the remaining radiators 17 of the house, the discharge 18 from the radiator is conducted through the heat storage device 10. There the water is subjected to a first increase in temperature and then reaches the three-way valve 20 through the conduit 19. If by now the temperature of the water is adequate for space heating, then the heat carrier again reaches the input 21. If the water temperature is not adequate for the heating demand, then the three-way valve is pivoted to the position shown at 20a. The water then reaches the heat storage device 6 via the conduit 22, whence it may again selectively by means of the three-way valve 23, proceed directly into the input conduit 21 or, when the further three-way valve is in the position shown at 23a, it may be conducted via the conduit 24 through the heat exchanger 2 and then enter the input conduit 21 only when it has reached its maximum temperature. Discharge 18 and input 21 as well as conduits 19–24 all form part of a heat user circuit.

In accordance with the invention heat is consumed at any time only at the lowest possible temperature, and only on extremely cold days is an input temperature achieved in the conduit 21 owing to the valve positions 20a and 23a, which corresponds approximately to the temperature of the remote heating conduit 1.

The heating of the water for consumption also takes place by counter-flow through the conduit 25 which leads from the water supply conduit to the heat exchanger 26, thence flows through the heat exchanger 27 and thereafter the heat exchanger 28, in order finally to be supplied via the conduit 29 to the hot water supply grid of the consumer. For the purpose of meeting an extreme peak demand, the burner 47 is provided which gives off its heat via the heat exchanger 48 to the heat storage device 6 as well as the heat exchanger 4, so that the heat which is additionally provided by it can also be transmitted to the other heat storage devices. The burner 47 may alternatively be provided in the circuit (23-18).

FIG. 2 shows a remote heating grid having the input conduit 1 and the return conduit 15 and two compensating conduits 30 and 31 where all of the conduits form part of a heat supply circuit. Between the input 1 and the compensating conduit 30 a first group of consumers 34 is connected, whose heating systems require a high water temperature. The remote heat carrier stream is subjected to slight cooling in the latent heat storage device 32 and reaches the compensating conduit 30 through the return conduit 33. From there the latent heat storage devices for the consumers 36, operating at a lower temperature, are supplied. From the compensating conduit 31 water which has by now been cooled to a substantial extent reaches such buildings in which a heat pump is installed, the evaporator 37 and thence via the conduit 38 the return conduit 15. The compressor 39 sucks an expanding working medium from the heat exchanger 40, which acts as a liquifier. The latter supplies the heating circuit 41. Via the throttle valve 42 the working medium condensate again reaches the heat exchanger 37. By switching over the fourway valve 43 into the position 43a the same heat pump acts as a refrigeration machine. It withdraws cold water from the return conduit in the direction of the arrow 44, heats it and conducts it into the compensating conduit 31 in the direction of the arrow 45. The fan 46 attends to the convective heat exchange.

We claim:

1. A heating circuit including a heat supply circuit of a predetermined transmission capacity adapted to be supplied with a heat carrier supply medium from a remote heating grid, a heat user circuit containing a heat carrier user medium for withdrawing heat from said heat supply circuit including a plurality of heating elements where the transmission capacity of the user circuit is greater than said predetermined transmission capacity of the supply circuit, at least one heat exchanger for exchanging heat between said supply circuit and said user circuit, a first latent heat storage device having a first heat storage mass in heat conducting contact with said one heat exchanger and where said first mass experiences a phase change at a temperature below the temperature of said heat carrier medium coming from the remote heat grid whereby heat supplied by said heat carrier medium may charge said heat storage mass during periods of low withdrawal of heat by said heat user circuit, a second heat exchanger for exchanging heat between said supply circuit and said user circuit and a second latent heat storage device containing a second heat storage mass in heat conducting contact with the second heat exchanger and where the second mass has a lower phase change temperature than the first mass and whereby said first heat exchanger is positioned upstream of said second heat exchanger with respect to the direction of flow of said heat carrier medium from said remote heating grid.

2. A heating circuit according to claim 1 wherein said heat supply circuit includes a return circuit connected to an output of the second heat exchanger and which connects with an input to said heat grid whereby cooled heat carrier supply medium may be recirculated back to said remote heating grid.

3. A heating circuit according to claim 2 wherein said heat user circuit includes first conduits connecting the downstream sides of said heat exchangers with said heating elements and a second conduit connecting the downstream side of the second heat exchanger with the upstream side of the first heat exchanger and a valve in said conduits for controlling flow of said heat user medium sequentially through said heat exchangers to said heating elements.

4. A heating circuit according to claim 1 wherein said grid comprises an input, a first compensating conduit, a second compensating conduit, a return conduit and wherein said first heat storage device is connected between said input and said first compensating circuit and said second heat storage device is connected between the first compensating conduit and a conduit selected from a group comprising said second compensating conduit and said return conduit.

5. A heating circuit according to claim 4 having in addition a heat pump comprising an evaporator connected in said return conduit.

6. A heating circuit according to claim 5 having in addition a switch means interposed in the heat user circuit whereby waste heat from said heat pump may be imposed on heat carrier supply medium withdrawn from said return conduit and imposed on a compensating circuit.

* * * * *